United States Patent [19]

Kleespies et al.

[11] 4,147,226

[45] Apr. 3, 1979

[54] LOCK-IN LOCK-OUT REAR HUB POWER ASSEMBLY

[76] Inventors: Richard M. Kleespies, 3780 El Camino; Fred F. Parke, 3993 Mountain Ave., both of San Bernardino, Calif. 92404

[21] Appl. No.: 811,688

[22] Filed: Jun. 30, 1977

[51] Int. Cl.² ............................................. B60K 25/00
[52] U.S. Cl. ................................ 180/70 R; 192/67 R; 192/93 A; 192/95
[58] Field of Search .............. 180/75, 76, 44 R, 70 R; 192/67 R, 93 A, 95; 403/1

[56] References Cited

U.S. PATENT DOCUMENTS

| | | | |
|---|---|---|---|
| 2,844,238 | 7/1958 | Peterson | 180/44 R |
| 3,184,258 | 5/1965 | Kapusta | 403/1 |

*Primary Examiner*—Robert R. Song
*Assistant Examiner*—Michael Mar

*Attorney, Agent, or Firm*—Dana E. Keech

[57] ABSTRACT

A kit including an axle to be substituted for a fixed flanged axle from which kit axle the flange is omitted and which includes an outward axle extension providing spaced bearings on which a kit wheel hub is rotatably supported, the inner end of the hub providing an annular flange which performs the same function as the replaced fixed axle flange by accepting the bolts normally used for supporting the adjacent brake drum and wheel of the vehicle. Both inner and outer ends of the substitute axle are splined, the inner end fitting into the splined differential socket provided therefor in the differential, the outer end fitting into a conventional wheel clutching mechanism mounted on the outer end of the axle housing hub, the mechanism being operable manually to optionally lock the substitute axle to the wheel hub and wheel or to disengage the substitute axle to permit the hub and wheel to turn freely thereon.

2 Claims, 2 Drawing Figures

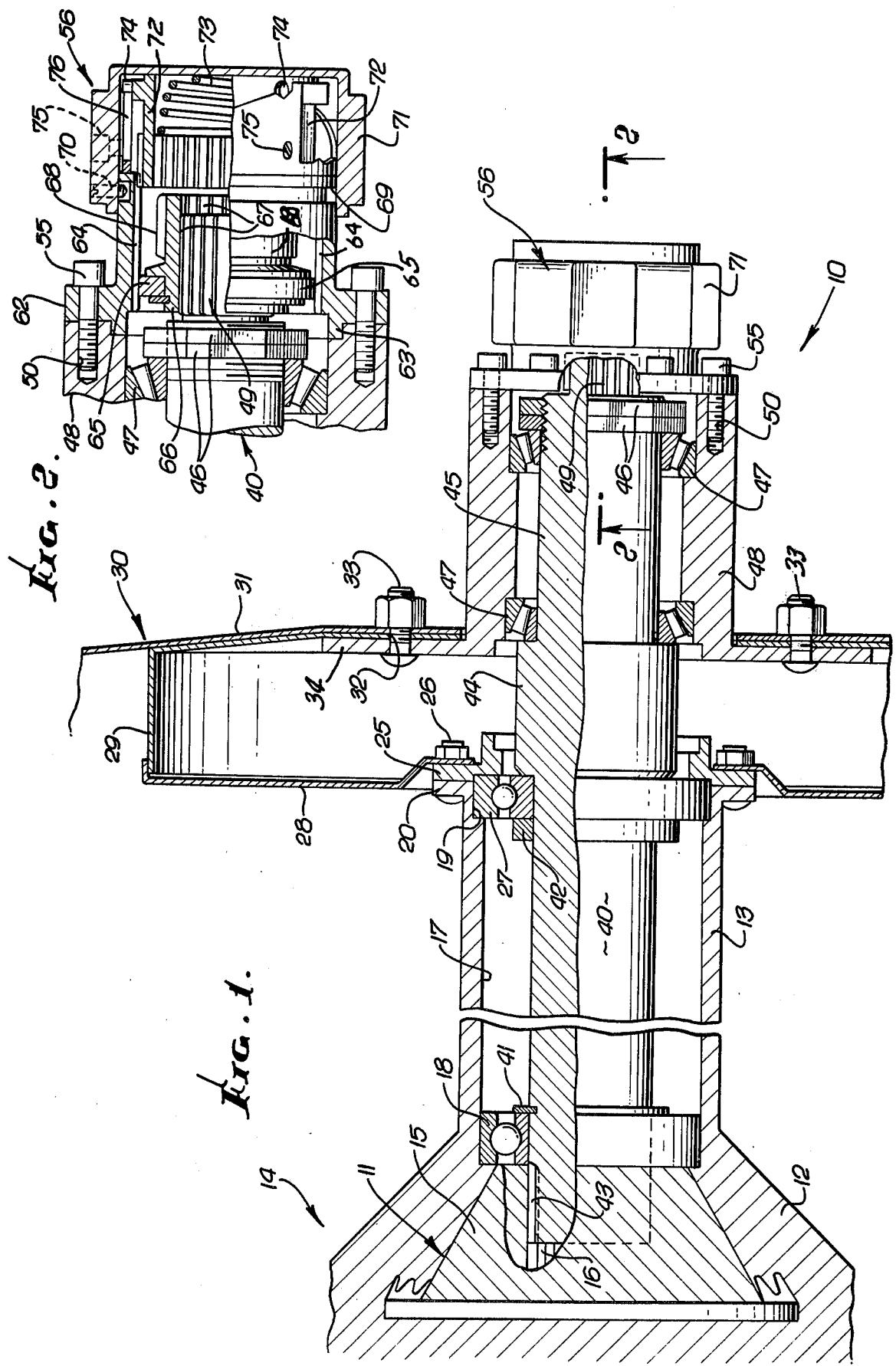

LOCK-IN LOCK-OUT REAR HUB POWER ASSEMBLY

BACKGROUND ART

The present invention is an improvement on a kit to convert a fixed live axle on a motor vehicle to a lock-in lock-out power hub which is disclosed and claimed in our co-pending application for U.S. Letters Pat. Ser. No. 796,769 filed May 13, 1977. In that kit, a fixed live axle which carries a brake drum and drive wheel disc mounting flange on the outer end of said axle was retained in the vehicle and said axle was provided with an outward extension having a radial flange fixed on its inner end which was bolted to the flange carried by the fixed live axle. Spaced bearings were provided on said extension axle (referred to in said application as a stub axle) and an axle housing hub was rotatably mounted on said bearings, said hub having a radial flange extending from the rear end thereof which assumed the function of supporting the rear drive wheel of the vehicle. A conventional wheel hub clutching mechanism is then mounted on the outer end of said axle housing hub, said mechanism being operable manually to optionally lock the stub axle to said axle housing and wheel or to disengage said stub axle to permit said housing and wheel to turn freely thereon.

Notwithstanding the effectiveness of the prior invention aforesaid in the attainment of its general purpose, it had certain characteristics which were subject to improvement. One of these was the necessity of widening the wheel tread of the vehicle approximately two inches when applying the kit of the invention to the opposite drive wheels at the rear end of the vehicle. It is accordingly an object of the present invention to provide a kit for investing a powered road vehicle with a lock-in lock-out rear hub power assembly which will not substantially widen the tread of the rear end of the vehicle in order to accomplish this.

Another characteristic of our previous kit aforementioned which is subject to improvement is the fact that when a vehicle was modified by the embodiment of the kit therewith, and the wheel hub clutching mechanism was actuated to cause the drive wheels at the rear end of the vehicle to be free wheeling, the rear wheels were completely free from the brakes at the rear end of the vehicle if an emergency would occur that would require the application of said brake to said wheels. It is accordingly another object of the present invention to provide an improvement of the aforesaid kit such that when a motor vehicle is modified by the application of the improvement thereto, the drive wheels and brake drums of the vehicle will remain united together and mounted on the same flanges which are subject to control by said wheel hub clutching mechanisms whereby when said mechanisms are set to permit free wheeling of the wheels, the latter will remain associated with their respective brake drums and subject to brake control should any emergency require this.

BRIEF DESCRIPTION OF THE DRAWINGS

FIG. 1 is a diagrammatic vertical transverse sectional view through a preferred embodiment of the invention after this has been installed in converting a fixed live axle of an automative vehicle to a lock-in lock-out rear hub power assembly.

FIG. 2 is a cross sectional view of the clutching mechanism of the invention taken on the line 2—2 of FIG. 1.

DETAILED DESCRIPTION OF THE PREFERRED EMBODIMENT

Diagrammatically illustrated in FIG. 1 is preferred embodiment 10 of the lock-in lock-out rear hub power assembly of the present invention. This assembly is shown as associated with the differential 11, the differential housing 12 and the rear axle housing 13 of a motor vehicle 14 and particularly with a differential drive gear 15 which has an axial spline bore 6. The axle housing 13 has a bore 17 which receives a ball bearing 18 and the outer end of axle housing 13 has a counterbore 19 and an annular external lip 20 to which an annular fitting 25 is secured by bolts 26 to trap a ball bearing 27 in the outer mouth of axle housing 13.

Also supported by bolts 26 on the outer end of axle housing 13 is a brake drum dust cover 28.

Also embraced by the structure of the motor vehicle 14 is a brake drum 29 and a vehicle drive wheel 30 including a central mounting disc 31, both the drum 29 and disc 31 being provided with aligned holes 32 for receiving bolts 33, which bolts are provided in the vehicle 14 for securing brake drum 29 and drive wheel disc 31 to an annular flange (not shown) which is similar to the flange 34 shown in FIG. 1 but which is fixed to the outer end of a drive axle (not shown) which comes with the motor vehicle 14 as it is manufactured and journals in the bearings 18 and 27 and has its inner end splined to engage the spline bore 16 of the differential drive gear 15.

All of the elements identified by numerals 11-33 and above described are embraced within the structure of the motor vehicle 14, the conversion of which to embody the present invention is about to be described.

The first step in such conversion is to remove the bolts 33 from the brake drum 29 and wheel 30 and then pull from the bearings 18 and 27 the drive axle journalling in said bearings when the motor vehicle 14 is manufactured, and which, as aforestated, has a radial flange on its outer end which in the manufactured vehicle 14 occupies identically the same space as the flange 34 of the invention is shown in FIG. 1 as occupying.

With the original flanged axle (not shown) removed from bearings 18 and 27, an elongated shaft 40 of the lock-in lock-out rear hub power assembly 10 is inserted through the bearings 27 and 18 so as to snugly fit the inner races of said bearings and be locked in place therein by rings 41 and 42. When the elongated axle 40 is thus inserted in place as shown in FIG. 1, a splined section 43 formed on its inner end extends into and meshes with the splined bore 16 of differential gear 15. A thickened mid section 44 of elongated axle 40 is disposed just outwardly from and abuts against the ball bearing 27. The uter section 45 of elongated axle 40 is threaded near its front end to receive nuts 46 which are used to center a pair of roller bearings 47 on a tubular wheel hub 48 on the inner end of which flange 34 is integrally formed.

Formed integral with the outer section 45 of axle 40 is a front splined section 49. Tapped holes 50 are provided in the outer end of tubular wheel hub 48 for receiving screws 55 to fasten to said hub a conventional wheel clutching and unclutching device 56. While the mechanism 56 may be selected from among many similar mechanisms already on the market, the device shown in the drawings as being preferable for our purposes is being presently marketed under the trademark "Selectro" by the Selectro Company located in Denver, Colorado.

The hub clutching device 56 is a self-contained manually controlled clutch having an annular base 62 from which an annular centering rib 63 extends into rear hub 48 to center mechanism 56 thereon.

Starting just within rib 63, annular clutch base 62 has internal splines 64. Pressed into the inner end of splines 64 so as to lodge therein is a bearing ring 65 in which a sleeve 66 journals freely, said sleeve having internal splines 67 which slideably mesh with splines of outer splined section 49 on axle 40. Base 62 extends outwardly a quarter of an inch beyond internally splined sleeve 66 and a front end portion of sleeve 66 also has external splines 68.

The base 62 has an annular external radial groove 69 near its front end to receive screws 70 from an internally cylindrical cap 71, to rotatably mount said cap on said base, for use in clutching or declutching the mechanism 56.

Enclosed within cap 71 is an internally and externally splined clutch tube 72 which is poised at the mouth of base 62 and spring biased by a coil spring 73 into joint meshing engagement with the internal splines 64 of base 62 and the external splines 68 on the front end of axle fitting sleeve 66.

The clutch tube 72 has three cam follower pins 74 extending radially outwardly at equally spaced intervals (120°) therefrom. Secured by radial screws 75 to the inner face of cap 71 is a triple phase cylindrical sheet metal cam 76 which, when rotated 120° in a counterclockwise direction by turning cap 71, compresses spring 73 and declutches mechanism 56, as shown in FIG. 2. A one-third reverse rotation of cap 71 releases the spring 73 allowing it to lock the clutch mechanism with this uniting vehicle drive axle 40 to the vehicle wheel disc 31.

When the mechanism 56 is thus declutched, as shown in FIG. 2, the internally and externally splined sleeve 66, although always spline connected to axle 40, is left freely rotatable within its mounting bearing 65 so that the wheel hub 48 is free to rotate on bearings 47.

The final step of conversion of the vehicle 14 to equip a drive axle thereof with the present invention of a lock-in lock-out rear hub power assembly 10, consists of inserting bolts 33 through the holes 32 provided in vehicle brake drum 29 and drive wheel mounting disc 31 and tightening these up so as to securely mount the brake drum 29 and wheel 30 on the wheel hub 48 of assembly 10.

It is to be noted that inasmuch as the flange 34 supports the brake drum 29 and drive wheel 30 rotated in exactly the same space with reference to the differential 11 of the vehicle 14 as before the conversion of said vehicle has been made, no change is effected in the width of the tread of said vehicle due to said conversion.

It is further to be noted that in the present invention, inasmuch as the brake drum 29 remains united with the adjacent drive wheel 30 even while the latter is released for free wheeling on the vehicle 14, that is, with respect to the drive axle 40 of the vehicle, the wheel 30 is nevertheless subject to control by the brake drum 29 upon the occurrence of any emergency requiring this.

We claim:

1. A lock-in lock-out rear hub power assembly for a wheeled vehicle comprising the combination of:

a differential axle driving mechanism provided on said vehicle;

elongated axle means making a rotary driven connection at its inner end with said mechanism;

bearing and housing means on said vehicle within which a substantial inner portion of said axle means journals and by which it is enclosed, a substantial integral outer portion of said axle means extending axially outward from within said bearing and housing means;

a tubular drive wheel hub radially flanged at its inner end and rotatably mounted on said outer portion of said axle means;

a brake drum and a drive wheel disc;

means on said hub flange for mounting said brake drum and drive wheel disc in approximately the same locations these elements are drive axle mounted in said vehicle as manufactured;

a hub clutching mechanism, said tubular wheel hub having bolt hole means on its outer end for use in securing said hub clutching mechanism thereto;

said outer axle portion having spline means for engaging said clutching mechanism to provide an optional lock-in, lock-out rear hub power assembly with respect to said drive wheel and said brake drum of said vehicle.

2. A combination as recited in claim 1 wherein said wheel hub journals upon a pair of anti-friction bearings mounted in spaced relation on said outer axle portion, and wherein a central section of said elongated axle located between said first recited bearing means and said last recited anti-friction bearing means is substantially reinforced by an increase in diameter.

* * * * *